April 23, 1963 H. D. HUEY 3,086,425

TURRET AND ELECTRONIC SIGHTING STATION

Filed May 29, 1946 6 Sheets-Sheet 1

INVENTOR.
HOMER D. HUEY

BY Donald W. Farrington

ATTORNEY

April 23, 1963 H. D. HUEY 3,086,425

TURRET AND ELECTRONIC SIGHTING STATION

Filed May 29, 1946 6 Sheets-Sheet 2

INVENTOR.
HOMER D. HUEY
BY Donald W. Farrington
ATTORNEY

TURRET AND ELECTRONIC SIGHTING STATION

Filed May 29, 1946 6 Sheets-Sheet 3

INVENTOR.
HOMER D. HUEY
BY Donald W. Farrington
ATTORNEY

TURRET AND ELECTRONIC SIGHTING STATION

INVENTOR.
HOMER D. HUEY
BY
Donald W. Farrington
ATTORNEY

April 23, 1963 H. D. HUEY 3,086,425

TURRET AND ELECTRONIC SIGHTING STATION

Filed May 29, 1946 6 Sheets-Sheet 5

INVENTOR.
HOMER D. HUEY

BY Donald W. Farrington

ATTORNEY

April 23, 1963

H. D. HUEY 3,086,425

TURRET AND ELECTRONIC SIGHTING STATION

Filed May 29, 1946

6 Sheets-Sheet 6

INVENTOR.
HOMER D. HUEY

BY Donald W. Farrington 3,086,425
Patented Apr. 23, 1963

3,086,425

TURRET AND ELECTRONIC SIGHTING STATION

Homer D. Huey, Baltimore, Md., assignor to Martin-Marietta Corporation, a corporation of Maryland Filed May 29, 1946, Ser. No. 673,198
12 Claims. (Cl. 89—37.5)

This invention relates to the structure, control and operation of a remotely controlled turret. A remotely controlled turret is distinguished from a locally controlled turret in that the latter has a gunner in the turret for sighting and firing the guns while the former is usually referred to as an uninhabited turret. The remotely controlled type permits a more compact design of turret that can be located advantageously on the airplane and used more effectively than a turret that must be designed to house a gunner and provide ready access and exit.

The turret of this invention is particularly adapted to high speed airplanes in that it is compact and streamlined and can be placed in remote portions of the aircraft and offers very little drag. A turret made in accordance with this invention can be placed in the nose or tail of the fuselage or crew nacelle or on the wing tips or floats.

In high speed aircraft, particularly in fighter airplanes intended to fly at approximately sonic speed, it is most important that drag be kept to a minimum. It is also obvious that due to the speed of approaching a target, the pilot cannot be relied upon to visually detect the target and train the guns of the turret on the target at the above mentioned speed. It is necessary that the pilot be warned well in advance of the approach of the target and this is done in this novel turret installation by means of an electronic detecting device, preferably employing a radar scanning device although a television scanner may be used.

The guns of this novel turret are mounted so that they can turn from a straight forwardly directed position to some angular position greater than 90° while the whole turret is being rotated about a longitudinal axis for 360°. In this manner, great coverage of the guns of the turret is obtained.

For example, such a turret in the preferred embodiment is mounted on the forward end of the fuselage of a fighter. The turret can be so mounted that it will rotate on the longitudinal axis of the fuselage, and be faired into the fuselage and form with the fuselage a continuous streamlined body. The tip or nose of the turret houses the radar detecting equipment, and the guns in the stowed position, remain substantially within the turret in a forwardly directed position where they may be employed as fixed guns in the normal fighter or they may be moved about their pivot points, as the whole turret is rotated on its longitudinal axis to fire on a target. The guns are so mounted in the turret that in the stowed position, they will not interfere with the scanning mechanism of the radar detecting device. The guns may be fired throughout the hemisphere forward of the pivotal axis of the guns, and to the rear of the plane through the axis of the guns until the airplane structure interferes with the gunfire or detecting device.

An object of this invention is the construction and operation of a novel turret that may be mounted on some remote portion of the airplane, in which the guns may be automatically trained on a target by a sighting station built into the turret.

Another object of this invention is to provide a remotely controlled turret that is equipped with a built-in electronic detecting device for searching for a target, locking on the target after it comes within predetermined angular range of the center line of the detecting device, and which will automatically cause the guns to be positioned relative to the target and allow for the proper amount of lead in accordance with the ballastics of the bullet.

Another object of this invention is the provision of a remotely controlled radar directed turret in which the guns in the stowed position offer very little drag on the airplane and which, in the stowed position, may be used as normal, forwardly directed fighter guns.

Another object of this invention is the provision of a remotely controlled turret having target detecting mechanism which advises the pilot of the position and location of a target and which may be employed to position the guns of the turret.

Another object of this invention is the provision of controls for an automatic detecting device mounted in a remotely controlled turret by which the detecting device may be caused to search for, find and lock on the target and subsequently cause the guns of the turret to be positioned to destroy the target.

Another object of this invention is a radar scanning device mounted in a turret in such a manner that it may search for or lock-on a target and subsequently cause the gunfire from the turret to destroy the target.

Further and other objects will become apparent from the description of the accompanying drawings which form a part of this disclosure and in which like numerals refer to like parts.

The turret shown in the embodiments illustrated in the accompanying drawings is a turret that affords maximum firing coverage by reason of the extreme flexibility of the turret and the guns, and includes a self-contained radar director and automatic control mechanism mounted on the turret. The principal feature of the turret being that the arrangement and the relationship of parts permits a turret of wide angle firing power to be mounted on some remote point of the airplane, such as the nose, tail, the wing tips or floats where it is impossible to have a locally controlled turret. Due to the particular construction of this turret, it is not necessary to include devices built into the aircraft structure between a sighting station and the turret to measure and correct for errors in accuracy of the turret guns due to structural deflection.

Figure 1:
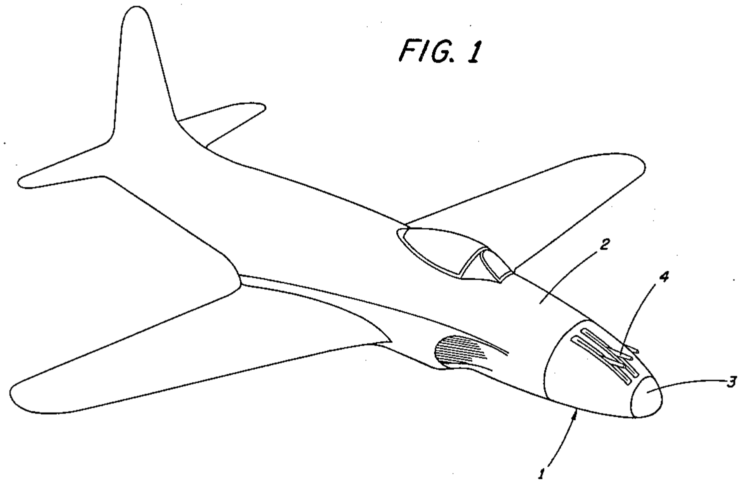
FIGURE 1 is a view of a high speed fighter airplane embodying the novel turret.

The preferred form of the turret is shown in FIGURE 1 and generally indicated as 1. It is mounted on the nose of the fuselage 2 of a high speed airplane. The turret is mounted to rotate 360° about the longitudinal axis of the fuselage. On the forward end of the turret is mounted a radome 3 which houses the scanning mechanism of the radar antenna. The turret in FIGURE 1 is in such a position that guns 4 are shown on the upper side of the turret.

The radome 3, or radar dome structure, may be made of any material and the proper thickness depending upon the material and the wave length of the particular frequency of the radar employed so that it will permit the passage of the radar signal with a minimum of interference. The radome is preferably made from materials having low dielectric losses, low moisture absorption and which are essentially non-conductors. The guns 4 in the stowed position are quite completely contained in the rotating portion of the turret as will be best shown in FIGURE 2.

The turret comprises three portions. The forward portion 3, previously described as the radome, houses the scanner mechanism of the radar antenna, immediately to the rear of the radome is portion 9 into which the guns are retracted when in the forwardly directed position. This portion houses some radar components and the gun mount. To the rear of the gun housing portion is the compartment which houses the ammunition boxes, hydraulic pump, ammunition belts and guides.

Figures 3, 6:
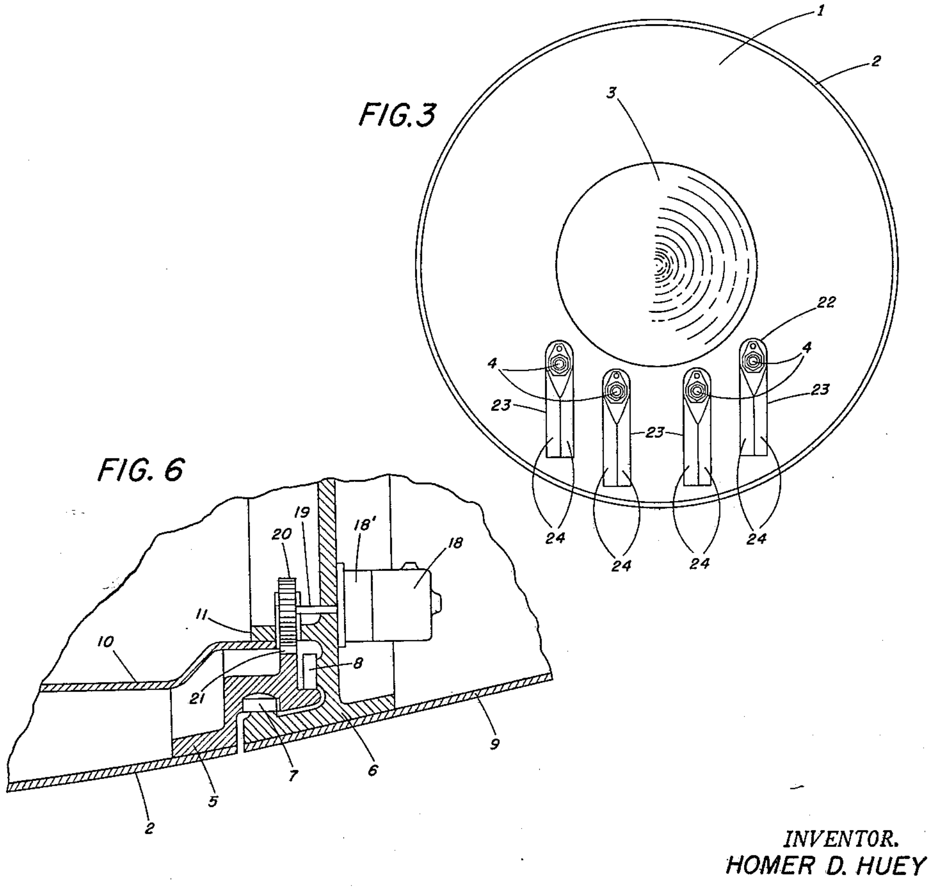
FIGURE 3 is a front elevational view of the turret.
FIGURE 6 is an enlarged fragmentary view showing the mounting and support of the turret on the aircraft structure.
Figures 4, 5:
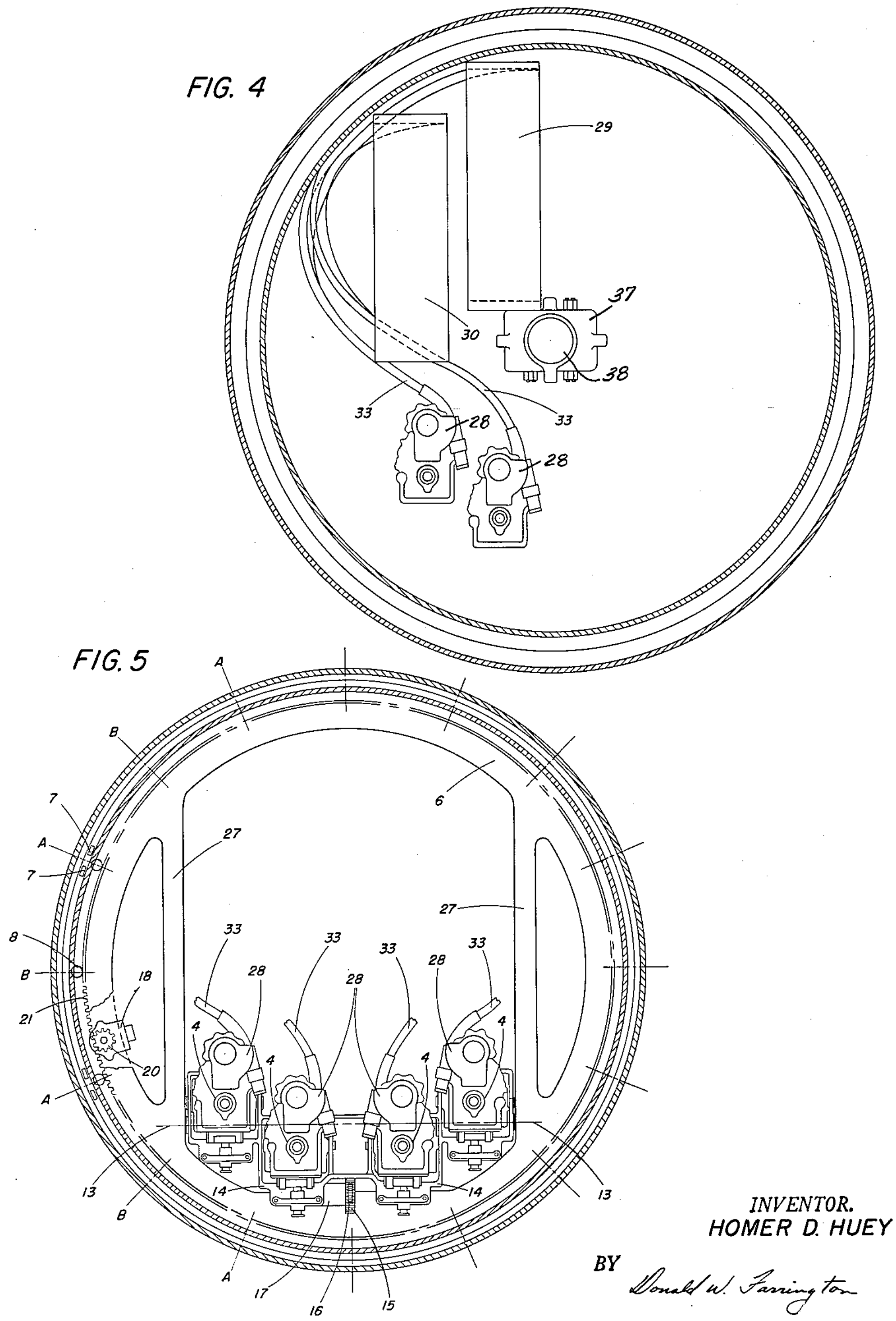
FIGURE 4 is a section taken on the line 4—4 of FIGURE 2.
FIGURE 5 is a section taken on the line 5—5 of FIGURE 2.
Figure 8:
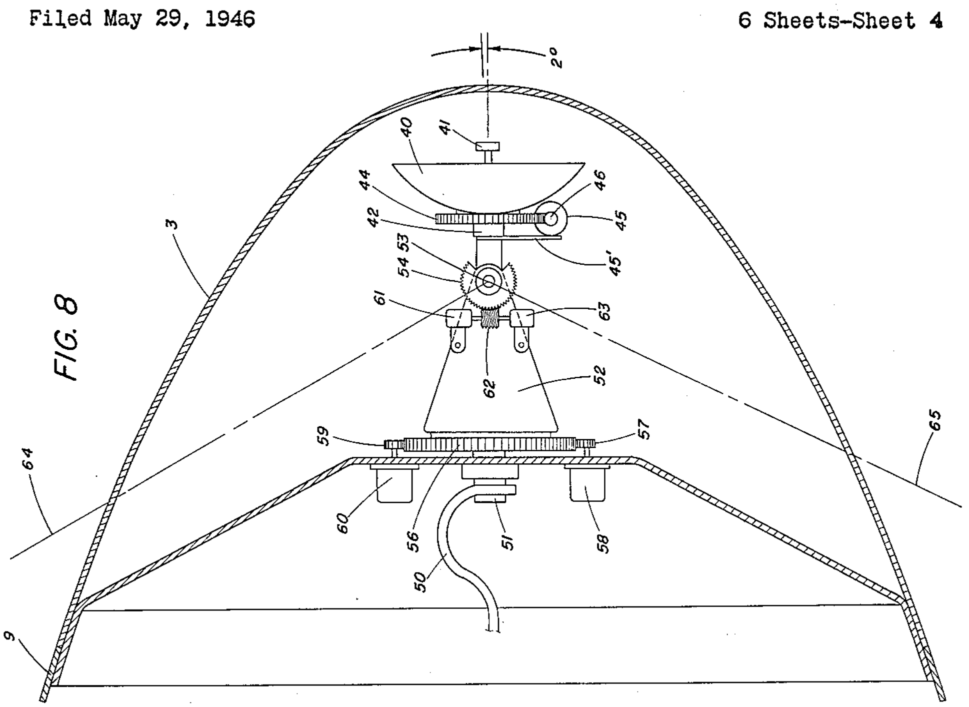
FIGURE 8 is an enlarged view of the radar antenna turned 90°.
Figure 7:
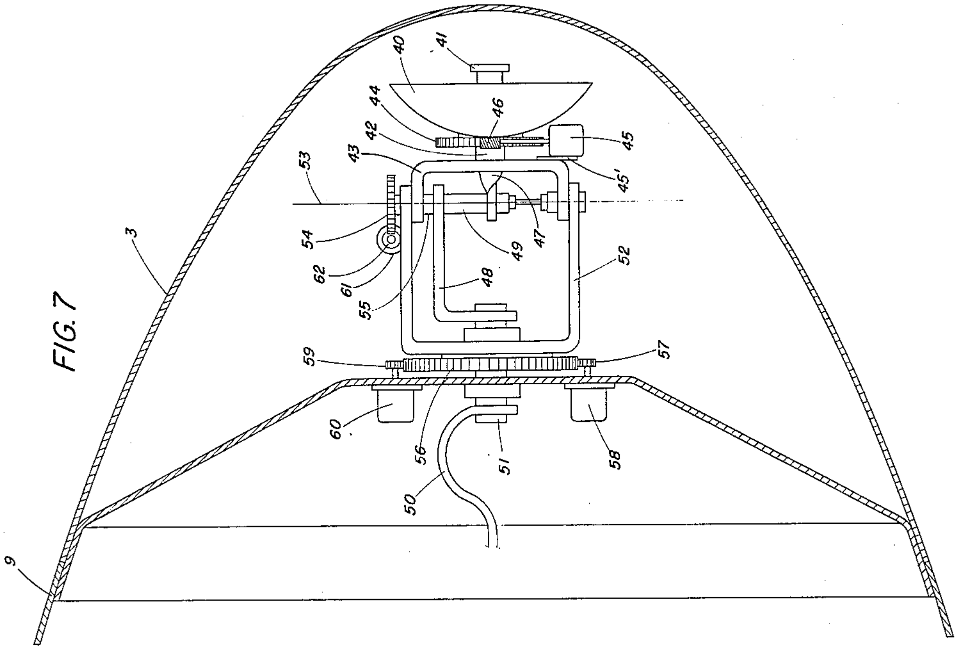
FIGURE 7 is an enlarged side view of the radar antenna in the nose of the turret.

The forward portion of fuselage 2 which constitutes a turret nacelle terminates in a ring 5 which forms a track and support for the above described turret. The turret portions are assembled on ring 6, which ring carries a plurality of rollers 7 to take longitudinal thrust and a plurality of rollers 8 to take radial thrust. This structure is best illustrated in FIGURES 5 and 6. On centerlines designated as "A," there are arranged longitudinal thrust rollers 7 and a radial thrust roller 8. Intermediate these rollers on centerline "B" are thrust rollers 8. The housing of the intermediate portion of the turret portion 9 is secured to the periphery of ring 6. The housing member 10 of the rear portion of the turret which extends within the forward portion of the fuselage is mounted and supported on flange 11 of ring 6. It can be seen from a consideration of FIGURES 2 and 6 that ring member 6, mounted for turning on ring member 5 which is supported by the fuselage, forms the base structure around which the turret is built.

Ring member 6 has formed integrally therewith brackets 12 which form supports for the pivots 13 of the gun cradle 14. This support for the guns will be described in more detail in connection with FIGURE 5. Gun cradle 14 is moved through an arcuate path by gear rack segment 15 driven by gear 16 of motor 17 which is also mounted on ring member 6. A motor 18, shown in FIGURE 6, is mounted on ring member 6 having a shaft 19 and a gear 20 which meshes with annular internal gear 21 of ring member 5. It will be seen from a consideration of FIGURE 6 that annular internal gear 21 is formed integrally with ring member 5 and is the structure against which motor 18 and gear 20 operate to drive the turret about the longitudinal axis of the fuselage. The fire coverage of the guns is obtained by the rotary motion of the turret about the longitudinal axis coupled with the pivotal motion of the guns through angle "*a*" between the stowed and the extended position. The angle of sweep of the guns can be designed to be any amount and is limited only by the interference of the wing tips of the airplane with the path of fire. Gunfire interrupters may be used to extend the range of the guns until the plane structure interferes with the electronic detecting device. The angle shown in FIGURE 2 is about 100° which will afford firing power over more than half of a forwardly directed sphere.

Figure 2:
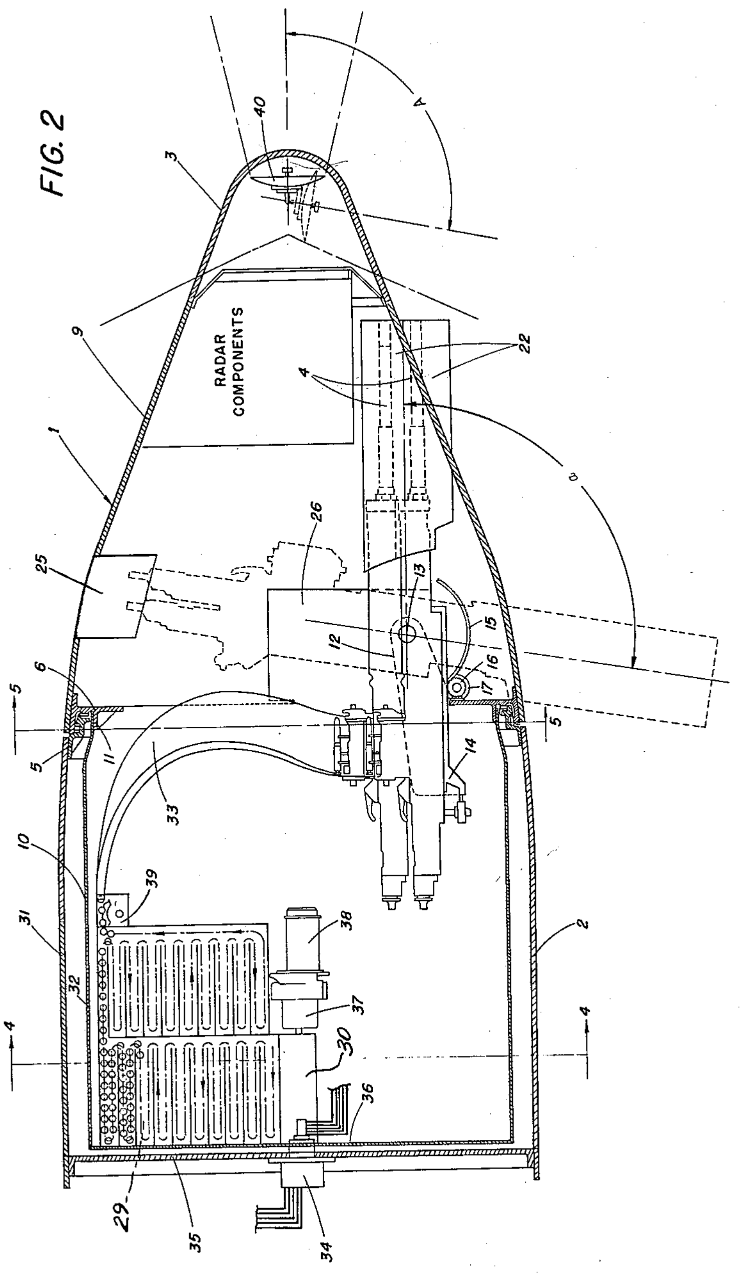
FIGURE 2 is a sectional view through the turret.

It should also be noted in FIGURE 2 that the scanning disc of the radar antenna is mounted for pivotal motion through an angle "A." This angle will be equal to angle "*a*" of the guns plus or minus the angle of lead depending upon the interconnection of the scanner and guns and method of compensating for the ballistics of the bullet from the gun.

The front elevational view of the turret shown in FIGURE 3 shows the arrangement of guns stowed as shown in FIGURE 2 in the forwardly directed position. Guns 4 have a streamlined cover or fairing 22 to decrease the drag on the aircraft when in the extended position. Since the longitudinal axis of the turret substantially parallels the line of flight, the relationship of the fairing to the airstream is maintained for minimum drag for all positions of the guns. The guns pivot about axis 13 in slots 23 from the stowed to the extended position. Slots 23 are provided with sealing lips 24 to close the slot opening but permit the sliding of the faired gun barrel in slot 23. While in FIGURE 3 an arrangement of four guns is illustrated, it is to be understood that any practical number of guns of any caliber can be arranged on a cradle to pivot about point 13.

Access door 25 is provided in the side of the skin in portion 9 opposite the butts of the guns in the extended position so that the guns may be removed for service or repair when they have been disconnected from cradle 14 through side access door 26.

It will be noted that the guns in the stowed position must terminate at such a point as will not interfere with the extreme angular position of the radar scanning mechanism when the radar detecting device is on search.

The mounting of the guns on cradle 14 is best shown in FIGURE 5. Annular ring 6 moves about supporting ring 5 on rollers 7 and 8. Gun cradle 14 extends between pivot bearings 13 and braces 27 formed integrally with ring 6. Ammunition boosters 28 are shown in FIGURE 5 mounted on the butts of guns 4 forming part of the ammunition feed mechanism.

The arrangement of the ammunition boxes and ammunition chutes to the gun feed boosters are shown in FIGURES 2 and 4. Boxes 29 and 30 are removable through access opening 31 (see FIG. 2) in fuselage 2 and opening 32 in wall 10 of the turret for reloading with belts of ammunition. An auxiliary ammunition booster 39 may be employed between the ammunition boxes and the track 33 if desired. Electric swivel connection 34 extends through transverse bulkhead 35 of the fuselage and the end 36 of the turret to afford the connection of the several electrical circuits shown in detail in the circuit diagram of FIGURE 9, for the power supply to the turret and the control circuits from the pilot control panel to the gun control and radar control mechanism. Pump 37 is driven by electric motor 38 and affords the hydraulic fluid pressure to actuate motor 18 to drive the turrets and motor 17 to elevate the guns. While it is appreciated that electric motor drive may be employed for both turret and gun movements, the hydraulic drive is preferred because of the saving in weight effected by the hydraulic motor drive equipment.

The radar sighting mechanism preferably consists of a mechanism to manually or automatically track a target and provide signals through a synchronous transmitter or generator system for the computer mechanism of the gun control that will keep the radar axis on the target. A servo system, controlled by a signal received from the computer and radar axis position, positions the guns. The radar mechanism consists of parabolic reflector 40 surrounding the dipole 41. The parabolic reflector is mounted so that its axis forms a small angle with the centerline of the dipole approximately 2° to 3°. The reflector is mounted for turning on a bearing 42 supported by bracket 43. Gear 44 is secured to reflector 40, and motor 45 through gear 46 causes the reflector to spin about the centerline of the dipole in the conventional manner. Motor 45 is mounted by bracket 45' on member 43. The wave guide portion 47 extends through the axis of bearing 42 to dipole 41. Wave guide portion 48 is connected to portion 47 through swivel joint 49, and wave guide portion 48 is connected to wave guide portion 50 through swivel joint 51. Bracket 43 is mounted for pivotal motion on bracket 52 on pivotal axis 53. Motor 61 through gear 62 drives segment 54, secured to the extension of shaft 55 to drive bracket 43 so that the bracket and spinning scanner mechanism will oscillate about pivotal axis 53 to sweep or scan the space in front of the turret as the scanner rotates on gear 56, for a target. Bracket 52 is mounted on gear 56 which is driven by gear 57 and motor 58. Gear 59 meshes with gear 56 and furnishes a reference signal to the control system through synchronous transmitter motor 60. Synchronous transmitter motor 63 is mounted on an extension of the shaft of motor 61 and gear 62 to give a reference signal to the control system.

Figure 9:
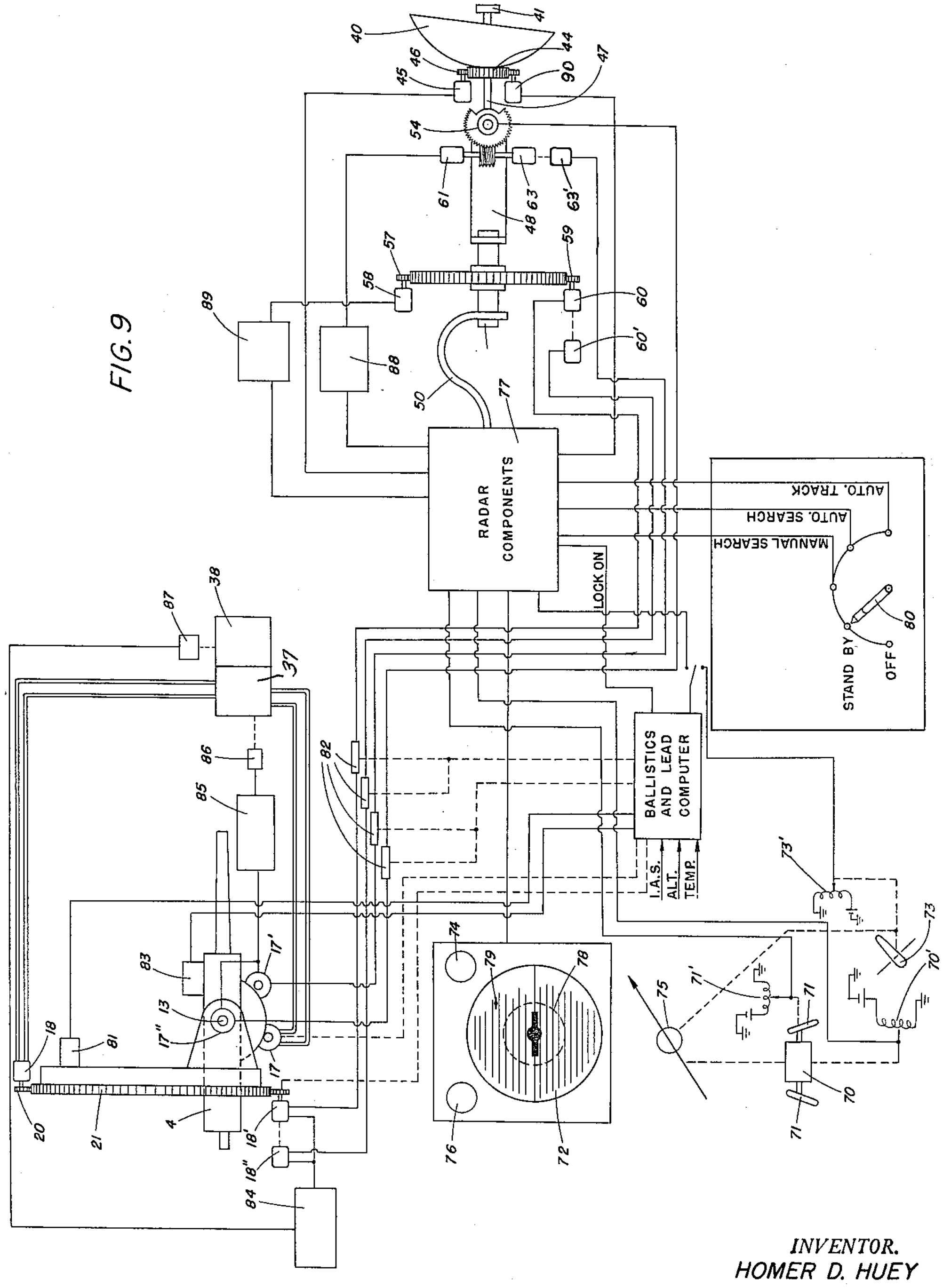
FIGURE 9 is a block diagram of the radar antenna and gun direction and drive mechanism shown in connection with the controls.

The block diagram in FIGURE 9 shows the relationship of the above described radar sighting mechanism to the guns and the turret as well as the control components of the circuit. This diagram is a comprehensive arrangement of elements to give manual or automatic search and track of a target by the radar sighting station. It should be pointed out in the block diagram of FIGURE 9 that the solid lines show electrical connections and the dashed lines show mechanical connections between related components.

A manual control 70 including hand grips 71 is also shown in the circuit whereby the co-pilot or gunner can, in an emergency, manually search or manually track a target which is detected and followed on screen 72 of the radar equipment, or can manually direct the guns and turret. As a part of the emergency control, foot pedal 73 operates the range finding mechanism. The manual control for directing the turret and guns simulates the signals that would normally be received from the synchronous transmitters located in the automatic system. Potentiometers 70′ and 71′ supply signal impulses for gun training and potentiometer 73′ provides a signal impulse for ranging under manual control conditions. Sight 75 is used in conjunction with the manual or emergency control of the guns and turret.

Signal light 74 is connected to the range finding mechanism and indicates when the target is in a predetermined range, for example, 1000 yards. The range may also be approximately determined from the width of the image of the target on screen 72.

Electrical switch 80 enables the pilot or co-pilot to govern the condition of operation of the turret and sighting station. When the switch is in the "stand-by" position, all components of the circuit are energized ready to function. When the switch is in the manual search position, the detecting device can be directed and targets detected by it will appear on the screen 72. For automatic search, switch 80 is positioned so that the sighting station will be caused to operate and scan the area forwardly and laterally of the turret to detect any targets which will appear on the screen 72. When the target comes within a predetermined angular position, for example, a circle 12° from the centerline of the radar axis of the detecting device, the mechanism may be switched to automatic tracking. The 12° range may be indicated on the screen 72 as a circle 78 and when target 79 is seen to come within circle 78, switch 80 may be put on automatic tracking. This means that thereafter the guns and turret motors will be energized and the radar unit will lock-on the target and center on it. The image of the target on screen 72 will move to the center of the screen. The guns will then be trained on the target ready for firing when range light 74 indicates that the target is within a predetermined range. The firing may be accomplished through the same signal that lights the range light or it can be manually controlled, the latter is preferred. After a target has been detected by either manual or automatic search and switch 80 so positioned that the guns will be controlled by the sighting station to track the target, no further manipulation on the part of the pilot or co-pilot is required other than control of the firing after the target has been identified as friend or foe.

Unit 77 houses the radar components and power supply as well as equipment to receive and transmit signals to and from other components of the circuit elements. The power supply in unit 77 furnishes the power for motor 45 that spins the scanner. Power is supplied to motor 61 through servo amplifier 88 that oscillates the scanner. Motor 58 receives its power through servo amplifier 89 to rotate the scanner. It also contains the magnetron that furnishes the ultra high frequency wave that is transmitted through wave guide 50, 51, 48 and 47 to the di-pole 41. Synchronous transmitters 45′, 63 and 60 furnish reference signals to the ballistics and lead computer or to the turret motor to control the position of the guns in space in reference to the radar axis. Synchronous transmitter 60 comprises the conventional course and fine transmitters 60 and 60′ which are connected through conventional differential synchros 82 wherein the signals are modified by the ballistics and lead computer before going to synchronous receivers 18′ and 18″. In a similar manner, the signal from synchronous transmitters 63 and 63′ are transmitted through differential synchros to synchronous receivers 17′ and 17″, 18′ and 18″ operate through servo amplifiers 84 and 85 to control the pump control servo 86 and 87 of the variable volume hydraulic pump. Reference generator 90 is employed to indicate the position of the radar axis at the time of sending and receiving the radar signal. The variable volume hydraulic pump 37 actually contains two separate pumps and an electric motor drive 38 therefor in the one unit. Hydraulic motors 17 and 18 are driven by the hydraulic pumps to control position of the turret and the guns. The guns will be positioned in space relative to the radar axis with the proper amount of lead so that the guns may destroy the target. Several other factors enter into the control picture as modifying factors for accuracy and precision. A signal from a conventional air speed device is transmitted to the ballistics and lead computer to give a measure of indicated air speed. Other signals from conventional equipment transmit to the ballistics and lead computer indications of altitude and temperature. Signals from rate gyro 81 mounted on the turret and rate gyro 83 mounted on the gun are also transmitted to the ballistics and lead computer to modify the output signal. The net correction from the computer is put into the control system through the differential synchros 82.

Due to the structural arrangements of the novel turret and sighting station, it is particularly adapted for high speed fighter aircraft. The guns may be used in the conventional manner in their forwardly directed position. The sighting station may be used to furnish valuable information to the pilot or co-pilot and can be made to lock-on a target and train the guns to follow the target through a wide field of fire. In any such turret installation, the sighting mechanism is located in the same structure with the gun mount. There is, therefore, no problem, or errors due to structural deflection between the sighting station and the gun mount. Television equipment may be employed to place the eye of the gunner at the remote turret and carry out the thought of this invention that the electronic sighting station may be employed to automatically position the guns of a turret on a target, but due to limitations of the television equipment to targets that can be seen by the human eye, the radar detecting and sighting station is preferred because it will operate at night and through clouds and fog.

Figure 10:
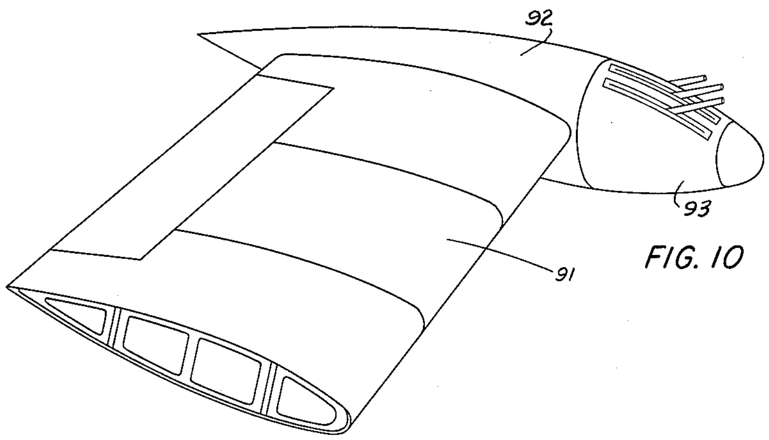
FIGURE 10 is a fragmentary view of an airplane wing showing a wing tip installation of the turret.
Figure 11:
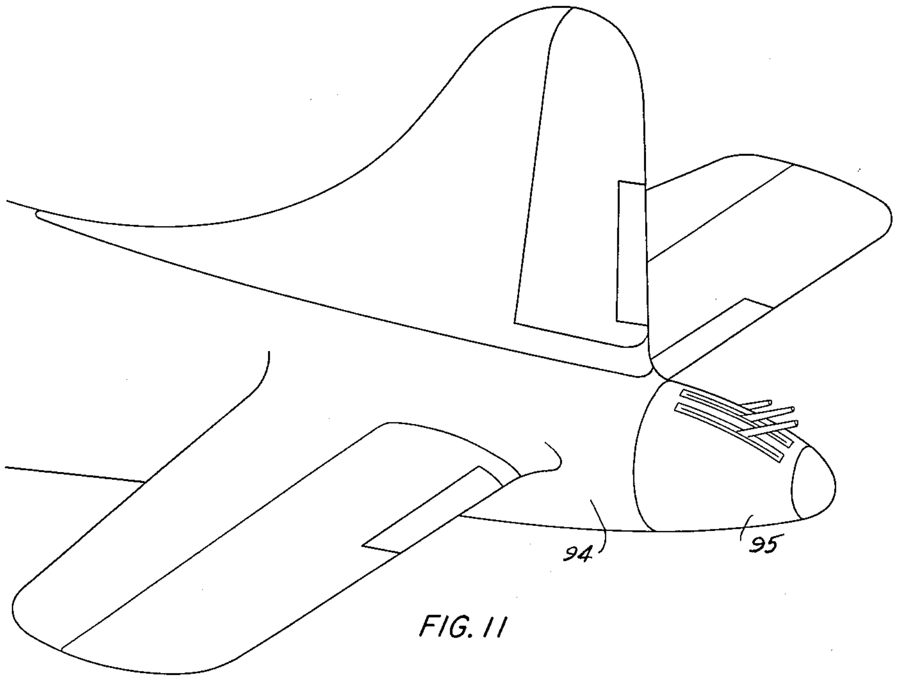
FIGURE 11 is a fragmentary view of the empennage of the airplane showing a tail turret installation.

FIGURES 10 and 11 show alternative ways in which a turret of the above-described type may be applied to an aircraft. In FIGURE 10, a nacelle 92 is formed at the tip of wing 91 and a turret 93 similar to the turret 1 shown in FIGURE 1, is rotatably mounted therein. Similarly in FIGURE 11, the rear portion of the fuselage constitutes a nacelle 94 for the rotatable turret 95.

It is to be understood that certain changes, alterations, modifications and substitutions can be made without departing from the spirit and scope of the appended claims.

I claim as my invention:

1. A remotely controlled turret and automatic sighting station so constructed and arranged to be mounted in a streamlined shaped structure mounted on an aircraft, the longitudinal axis of which is substantially parallel to the line of flight, transverse mounting ring on the forward end of the aircraft structure, a turret ring supported by roller bearings for turning in said mounting ring, motor operated means to turn said turret ring on said mounting ring, guns pivoted from supports secured to said turret ring, said guns being capable of turning from a forwardly directed to a lateral position, a turret housing having slots formed therein through which the barrels of said guns extend, said housing being secured to said turret ring and extending forwardly therefrom to form the forward portion of the streamlined shaped structure, a radar scanner sighting means located at the outer end of said turret housing for detecting targets within the field of fire coverage of said turret, a cover member therefor faired into said turret member to complete the streamlined structure, a housing member secured to said turret ring extending on the opposite side of said ring from said turret housing inwardly of said streamlined structure, ammunition boxes and feed mechanism, and turret drive components being located in said housing member, whereby they tend to counterbalance said guns and said sighting means in the forwardly extending turret housing, said guns being spaced laterally from the axis of said turret so that in the forwardly directed position they may fire without interfering with said sighting means and in said position said guns extend longitudinally of said last named housing member and said turret member and in the laterally extended position, the butts of the guns pivot to a position wholly within said turret housing, and means including said motor operated means for moving said guns into firing position against a target detected by said sighting means.

2. A gun turret structure of elongated, tapered, streamlined shape mounted on an aircraft structure with its longitudinal axis substantially parallel to the line of flight, a radar sighting mechanism disposed in the nose of said streamlined body, a housing member for said sighting mechanism faired into the structure of said turret forming the nose thereof, said turret structure being mounted on said aircraft structure for rotation about said longitudinal axis, motor means to rotate said turret, guns mounted in said turret structure to pivot in a plane parallel to the line of flight from a forwardly directed position to a lateral position, motor means to move said guns, the pivots of said guns being so located that the guns in the forwardly directed position are laterally spaced from and extend alongside the sighting station so that they may be fired from a forwardly directed position to a lateral position without interfering with the sighting mechanism, control means interconnecting said gun motor means and said turret motor means with said sighting mechanism to train said guns on a target detected by said sighting mechanism.

3. A remotely controlled turret and sighting station in a streamlined shaped structure mounted on an aircraft, one portion of said structure being fixed to the aircraft forming a turret nacelle, another portion of said structure forming the turret and sighting station, being mounted in said turret nacelle for turning about the longitudinal axis thereof, the nose portion of said rotating structure housing the sighting station, a plurality of guns mounted in said turret portion pivoted for turning from a position parallel to the longitudinal axis of the turret to a lateral position, said guns in the first mentioned position being almost entirely within the structure of the turret, said guns extending parallel to the axis of the turret but laterally spaced from said sighting station, a scanning means mounted in said sighting station to rotate with the turret or independently of the turret about the longitudinal axis thereof, said scanning means also mounted to pivot about an axis parallel to the pivotal axis of the guns to move with the guns or independently of the guns, said scanning means so constructed and arranged that it will scan the area ahead of and to the side of the turret, control means to move said scanning means on its pivotal axis to scan an area greater than a hemisphere, said control means including means to locate said scanning means on a target and to actuate said gun motors to cause said turret and said guns to follow the target and means responsive to flight conditions to insert the proper amount of lead between the sighting station and the guns to compensate for ballistics to cause the gunfire to hit targets detected by said sighting station.

4. A gun turret structure of elongated, tapered, streamlined shape mounted on an aircraft structure with its longitudinal axis substantially parallel to the line of flight, an electronic scanner and sighting means disposed in the forward portion of said streamlined shaped turret structure adjacent the axis thereof for detecting targets within the field of fire coverage of said turret, a housing member for said sighting means faired into the structure of said turret forming the nose thereof, said turret structure being mounted on said aircraft structure for rotation about said longitudinal axis, guns mounted in said turret structure spaced laterally from said axis and arranged to pivot from a position parallel to said turret axis to a lateral position, the pivot of said guns being so located that the guns in the first mentioned position are laterally spaced from and extend alongside the sighting means so that they may be fired from said first mentioned position to a lateral position without interfering with said sighting means, and means for moving said guns into firing position against a target detected by said sighting means.

5. A remotely controlled turret and automatic sighting station so constructed and arranged to be mounted in a streamlined shaped structure mounted on an aircraft, the longitudinal axis of which is substantially parallel to the line of flight, a transverse mounting ring on the forward end of the aircraft structure, a turret ring supported by roller bearings for turning in said mounting ring, motor operated means to turn said turret ring on said mounting ring, guns pivoted from supports secured to said turret ring, said guns being capable of turning from a forwardly directed to a lateral position, a turret housing over said guns secured to said turret ring and extending forwardly therefrom to form the forward portion of the streamlined shaped structure, a scanner sighting mechanism located at the outer end of said turret housing adjacent the longitudinal axis thereof, a cover member therefor faired into said turret member to complete the streamlined structure, a housing member secured to said turret ring extending on the opposite side of said ring from said turret housing inwardly of said streamlined structure, ammunition boxes and turret drive components being located in said housing member, whereby they tend to counterbalance said guns and said sighting mechanism in the forwardly extending turret housing, said guns being so pivoted on said turret ring that in the forwardly directed position said guns may be fired without interfering with the sighting mechanism and in said position said guns extend longitudinally of said housing member and said turret member spaced laterally of the axis thereof, and in the laterally extended position, the butts of the guns pivot to a position wholly within said turret structure, and ammunition chutes for feeding ammunition from said boxes to said guns for all positions of the gun within the turret.

6. A remotely controlled streamlined shaped turret and sighting station mounted on an aircraft, a portion of said aircraft constituting a turret nacelle, a transverse mounting ring on the end of said turret nacelle, a turret ring supported for turning within said mounting ring, motor operated means for turning said turret ring on said mounting ring, a housing member mounted on said turret ring extending within said turret nacelle, a turret housing extending on the opposite side of said turret ring contoured to form a streamlined extension of said turret nacelle, an electronic sighting means secured to the outer end of said turret housing for detecting targets within the field of fire coverage of said turret, a cover member for said sighting means formed to complete said streamlined shaped structure, guns pivoted for turning on a bracket secured to said turret ring from a position parallel to the line of flight to a position lateral of said turret, said guns being so spaced within said turret structure that they may be fired in said first mentioned position without interfering with the sighting means, the butts of the guns in this position extending through said turret ring into the housing member within the nacelle, said pivot point of said brackets being located outwardly of said turret ring so that the guns may pivot from the position parallel to the line of flight through an angle greater than 90°, the butts of the guns in the extended position remaining entirely within said turret housing, and means including said motor operated means for moving said guns into firing position against a target detected by said sighting means.

7. A remotely controlled turret and sighting station in a streamlined shaped structure mounted on an aircraft, one portion of said structure being fixed to the aircraft forming a turret nacelle, another portion of said structure forming the turret and sighting station, being mounted in said turret nacelle for turning about the longitudinal axis thereof, the nose portion of said rotating structure housing the sighting station, a gun mounted in said turret portion pivoted for turning from a position parallel to the longitudinal axis of the turret to a lateral position, said gun in the first mentioned position being almost entirely within the structure of the turret, said gun extending parallel to the axis of the turret but laterally spaced from said sighting station, a scanning means mounted in said sighting station to rotate independently of the turret about the longitudinal axis thereof, said scanning means also mounted to pivot about an axis parallel to the pivotal axis of the gun to move independently of said gun, said scanning means so constructed and arranged that it will scan the area ahead of and to the side of the turret, control means to move said scanning means on its pivotal axes to scan an area of at least a hemisphere, said control means including means to lock said scanning means on a target and to actuate said turret motors to cause said turret and said guns to follow the target.

8. A remotely controlled gun turret structure of elongated, tapered, streamlined shape mounted on an aircraft structure with its longitudinal axis substantially parallel to the line of flight, an electronic sighting means disposed in the forward portion of said streamlined shaped turret structure, a housing member for said sighting means faired into the structure of said turret forming the nose thereof, said turret structure being mounted on said aircraft structure for rotation about said longitudinal axis, guns mounted in said turret structure spaced laterally from said axis and extending through slots in the sides thereof to pivot from a forwardly directed position to a lateral position, the pivots of said guns being located rearwardly of said sighting means so that the guns in the forwardly directed position are laterally spaced from and extend alongside the sighting means so that they may be fired from a forwardly directed position to a lateral position without interfering with said sighting means.

9. A remotely controlled streamlined shaped turret and sighting station mounted on an aircraft, a portion of said aircraft constituting a turret nacelle, a transverse mounting ring on the end of said turret nacelle, a turret ring supported for turning within said mounting ring, motor operated means for turning said turret ring on said mounting ring, a housing member mounted on said turret ring extending from one side thereof within said turret nacelle, ammunition boxes and turret drive components located in said housing member, a turret housing extending on the opposite side of said turret ring contoured to form a streamlined extension of said turret nacelle, an electronic sighting means secured to the outer end of said turret housing and located adjacent the longitudinal axis of said turret for detecting targets within the field of fire coverage of said turret, a cover member for said sighting means formed to complete said streamlined shaped structure, guns pivoted for turning on brackets secured to said turret ring from a position parallel to the line of flight to a position lateral of said turret, said ammunition boxes and drive components tending to counterbalance said guns and said sighting means in the turret housing, said guns being spaced laterally from the axis of said turret structure so that they may be fired in said first mentioned position without interfering with said sighting means, the butts of the guns in this position extending through said turret ring into the housing member within the nacelle, said pivot point of said brackets being located outwardly of said turret ring so that the guns may pivot from a position parallel to the line of flight through an angle greater than 90°, the butts of the guns in the extended position remaining entirely within said turret housing, slots in the side of said turret member through which the guns pivot from the forward to the lateral position, a streamlined fairing covering each of said gun barrels to reduce the drag of the barrels when in the extended position and sealing strips on the edges of said slots to close said slots against airflow but permit the movement of the guns from the forward to the extended position, and means including said motor operated means for moving said guns into firing position against a target detected by said sighting means.

10. A remotely controlled turret and sighting station in a streamlined shaped structure mounted on an aircraft, one portion of said structure being fixed to the aircraft forming a turret nacelle, another portion of said structure forming the turret and sighting station and being rotatably mounted for turning about its longitudinal axis in said turret nacelle, the nose portion of said rotatable portion housing the sighting station, a plurality of guns mounted in said turret pivoted for turning from a position parallel to the longitudinal axis of the turret to a lateral position, said guns in the first mentioned position being almost entirely within the structure of the turret, said rotating structure being almost entirely within the structure of the turret, said turret having slots formed in the sides thereof through which said guns extend, said guns extending parallel to the axis of the turret but laterally spaced from said sighting station, an electronic scanning means mounted in said sighting station to rotate with the turret or independently of the turret about the longitudinal axis thereof, said scanning means also mounted to pivot about an axis parallel to the pivotal axis of the guns to move with the guns or independently of the guns, said scanning means so constructed and arranged that it will scan the area ahead of and to the side of the turret, control means to move said scanning means on its pivotal axis to scan an area of at least a hemisphere, said control means including means to lock said scanning means on a target and to actuate said gun motors to cause said turret and said guns to follow the target and means responsive to flight conditions to insert the proper amount of lead between the sighting station and the guns to compensate for ballistics to cause the gunfire to hit the targets detected by said sighting station.

11. A remotely controlled gun turret structure of elongated, tapered, streamlined shape mounted on an aircraft structure with its longitudinal axis substantially parallel to the line of flight, an electronic sighting mechanism disposed in the forward portion of said streamlined shaped turret structure adjacent the longitudinal axis, a housing member for said sighting mechanism faired into the structure of said turret forming the nose thereof, said turret structure being mounted on said aircraft structure for rotation about said longitudinal axis, guns mounted in said turret structure spaced laterally from said axis and arranged to pivot from a forwardly directed position to a lateral position, the pivots of said guns being so located that the guns in the forwardly directed position are laterally spaced from and extended along the sighting mechanism so that they may be fired in said forwardly directed position without interfering with said sighting station.

12. A remotely controlled turret and automatic sighting station so constructed and arranged to be mounted in a streamlined shaped structure mounted on an aircraft, the longitudinal axes of which is substantially parallel to the line of flight, a transverse mounting ring on the forward end of the aircraft structure, a turret ring supported by roller bearings for turning in said mounting ring, motor operated means to turn said turret ring on said mounting ring, guns pivoted from supports secured to said turret ring, motor means for turning said guns from a position parallel to said turret axis to a lateral position, a turret housing over said guns secured to said turret ring and extending forwardly therefrom to form a portion of the streamlined shaped structure, a radar scanner sighting means located at the outer end of said turret housing for detecting targets within the field of fire coverage of said turret, a cover member therefor faired into said turret member to complete the streamlined structure, a housing member secured to said turret ring extending on the opposite side of said ring from said turret housing inwardly of said streamlined structure, ammunition boxes and turret drive components being located in said housing member, whereby they tend to counterbalance said guns and said sighting means in the turret housing, said guns being so pivoted on said turret ring that in the position parallel to said turret axis they may be fired without interfering with the sighting means and in said position said guns extend longitudinally of said housing member and said turret member and in the laterally extended position, the butts of the guns pivot to a position wholly within said turret housing, and means including said motor means for moving said guns into firing position against a target detected by said sighting means.

References Cited in the file of this patent

UNITED STATES PATENTS

| | | |
|---|---|---|
| 2,034,223 | Brady | Mar. 17, 1936 |
| 2,178,291 | Steurlein | Oct. 31, 1939 |
| 2,199,971 | Sanders | May 7, 1940 |
| 2,409,462 | Zworykin et al. | Oct. 15, 1946 |
| 2,419,239 | White | Apr. 22, 1947 |

FOREIGN PATENTS

| | | |
|---|---|---|
| 555,052 | Great Britain | Aug. 3, 1943 |

OTHER REFERENCES

"Popular Mechanics," p. 535, April 1937.
"Flight" Magazine, p. 62–b, Jan. 17, 1946.
"Aviation" Magazine, p. 34, September 1938.
Aero Digest, p. 50, Dec. 1, 1945.